Sept. 15, 1953   R. L. MELTZER ET AL   2,652,190
IMPELLER WHEEL

Filed Jan. 23, 1950   2 Sheets-Sheet 1

INVENTOR
RUDOLPH L. MELTZER
HENRY E. MELTZER

BY *Young Wright*

ATTORNEYS

Sept. 15, 1953     R. L. MELTZER ET AL     2,652,190
IMPELLER WHEEL
Filed Jan. 23, 1950     2 Sheets-Sheet 2
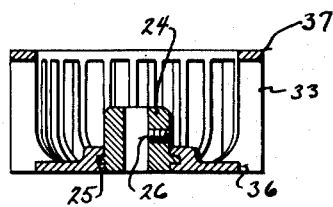
Fig. 8.
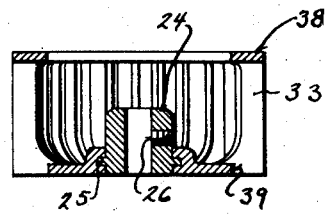
Fig. 9.
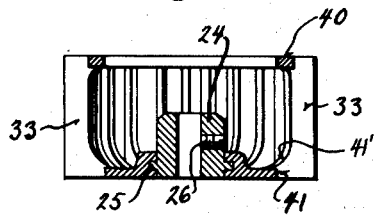
Fig. 10.
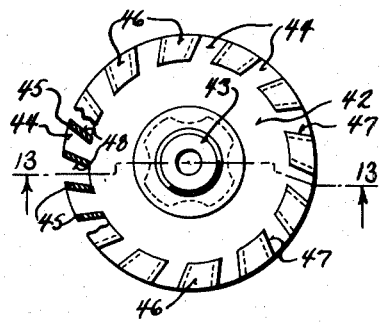
Fig. 11.
Fig. 12.
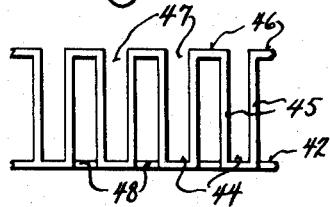
Fig. 13.
Fig. 14.
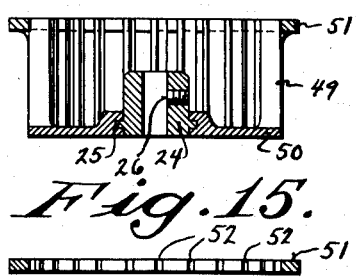
Fig. 17.
Fig. 15.
Fig. 16.     Fig. 18.
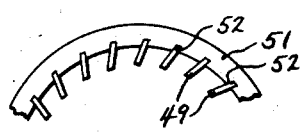
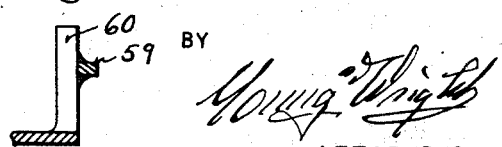
INVENTOR
RUDOLPH L. MELTZER
HENRY E. MELTZER
BY
Young Wright
ATTORNEYS Patented Sept. 15, 1953

2,652,190

UNITED STATES PATENT OFFICE 2,652,190

IMPELLER WHEEL

Rudolph L. Meltzer and Henry E. Meltzer, Racine, Wis., assignors to Master Appliance Mfg. Co., Racine, Wis.

Application January 23, 1950, Serial No. 139,998

1 Claim. (Cl. 230—134)

This invention appertains to air blowers, and more particularly to a novel centrifugal blower wheel or impeller of the type especially useful for small electrical appliances, such as, hair dryers, automobile heaters and windshield defrosters, etc.

One of the primary objects of the invention, is to provide a centrifugal air blower wheel, which will be light in weight, one that will be simple and easy to manufacture and one which will be exceptionally rugged in use.

Another salient feature of the invention, is to provide a centrifugal air blower wheel formed from plastic or like material, in which the vanes or blades will be effectively braced and reinforced at their terminals to prevent distortion thereof and to insure a strong durable wheel.

A further important object of the invention is to provide an impeller wheel embodying a hub plate or disc carrying laterally projecting vanes or blades and a ring for connecting and reinforcing the ends of the blades opposite to the hub plate or disc, the position of the ring being such that the entire wheel can be readily cast in one operation from a desired material, such as plastic or metal.

A still further important object of the invention is to provide a one-piece plastic air impeller wheel having a hub cast therein at the time of the molding thereof.

With these and other objects in view, the invention consists in the novel construction, arrangement and formation of parts, as will be hereinafter more specifically described and claimed, and illustrated in the accompanying drawings, in which drawings, Figure 1 is a front elevational view of our improved impeller wheel with parts thereof broken away and in section to illustrate structural detail.

Figure 8 is a diametric sectional view through a further modified form of the impeller wheel, in which the reinforcing ring is flush with the inner and outer edges of the blades.

Figure 9 is a diametric sectional view through a further modified form of the wheel in which the reinforcing ring for the blades extends slightly inwardly of the blades toward the axial center of the wheel.

Figure 10 is a diametric sectional view through a still further modified form of the wheel with the reinforcing ring disposed entirely within the plane of the inner edges of the blades.

Figure 11 is a front elevational view of a still further modified form of impeller wheel, parts of the figure being shown broken away and in section, the blades being reinforced in a different manner from the form of the wheel shown in Figures 1 to 10, inclusive.

Figure 12 is an enlarged fragmentary side elevational view of the type of impeller wheel shown in Figure 11.

Figure 13 is a diametric sectional view taken on the line 13—13 of Figure 11, looking in the direction of the arrows.

Figure 14 is a diametric sectional view through a type of impeller wheel, in which the reinforcing ring can be secured to the blades after the molding of the blades and hub plate.

Figure 15 is a diametric sectional view through the reinforcing ring before the securing thereof to the blades.

Figure 16 is a fragmentary, front elevational view of the type of impeller wheel in which the ring is slotted to receive the blades.

Figure 17 is a detail fragmentary diametric sectional view, illustrating the means for connecting a hub to the plate after the forming of the hub plate.

Figure 18 is a detail fragmentary diametric sectional view illustrating a still further slightly modified form of impeller.

Referring to the drawings in detail, wherein similar reference characters designate corresponding parts throughout the several views, the letter W generally indicates one preferred form of our wheel and illustrated in Figures 1 to 5, inclusive.

The impeller wheel W is preferably molded in one piece from plastic material and the wheel is so-designed that the same can be molded in one operation and so that a two-part permanent mold M can be conveniently separated to remove the wheel. While we have specifically stated that the wheel is molded from a plastic material, which is preferred, it is obvious that the wheel can be cast from other materials. The wheel W includes a hub plate or disc 20 having formed on the inner face thereof the laterally extending peripheral blades 21. The ends of the blades 21 opposite to the hub plate or disc 20 are reinforced by an integral ring 22. Attention is particularly directed to the fact that the inner periphery of the ring 22 is in axial alignment with the outer periphery of the hub plate or disc 20, consequently, the same can be easily removed from the two-part mold, as will be later set forth. If desired, short webs 23 can extend from the blades 21 under the ring 22 to further aid in the reinforcement of the wheel.

Figure 1:
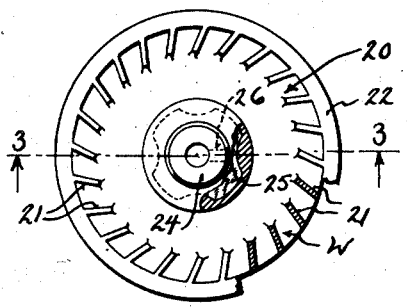
Figure 2:
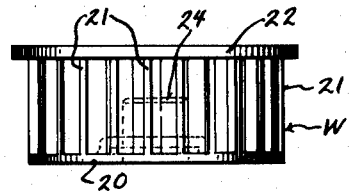
Figure 2 is a side elevational view of the improved wheel.
Figure 3:
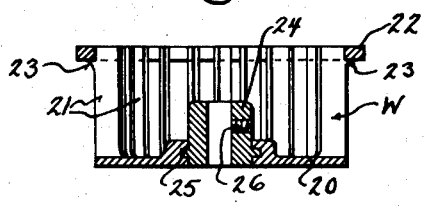
Figure 3 is a diametric sectional view, taken on the line 3—3 of Figure 1, looking in the direction of the arrows.

The hub plate 20 carries a hub 24 and the hub is preferably molded in the plate 20 at the time of the making of the wheel. As illustrated, the hub is provided, adjacent to its outer end, with radially extending keys or anchoring lugs 25, which are molded within the plate 20, as is clearly shown in Figures 1, 3 and 4. The hub 24 is provided with an axial bore for receiving the armature shaft of a motor (not illustrated), and the hub can be firmly secured to a shaft in any desired way, such as by a set screw 26.

Figure 4:
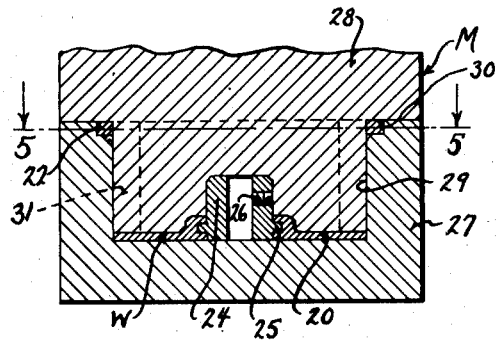
Figure 4 is a vertical sectional view, illustrating a step in the forming of one preferred form of our impeller wheel.
Figure 5:
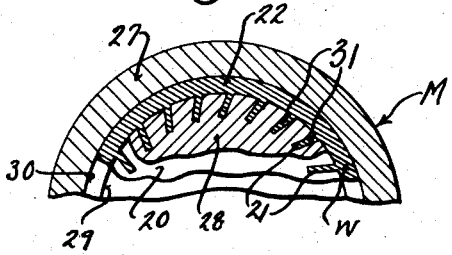
Figure 5 is a fragmentary, horizontal sectional view taken through the mold substantially on the line 5—5 of Figure 4, looking in the direction of the arrows.

In Figures 4 and 5, we have shown the mold M and this mold can be of any desired character, but as illustrated, includes the permanent female section 27 and the permanent male section 28. The female section 27 is provided with a mold cavity 29 and a rabbeted portion 30 to form the ring 22. The section 28 is formed to receive the hub 24 and its periphery is provided with equidistantly spaced grooves 31 which form the blades 21. Obviously, the section 28 can be readily pulled from the section 27 and the completed wheel can be easily removed from the section 27. Obviously, also, the mold can be formed in other manners and in lieu of the grooves 31 removable keys can be inserted in the mold.

Figure 6:
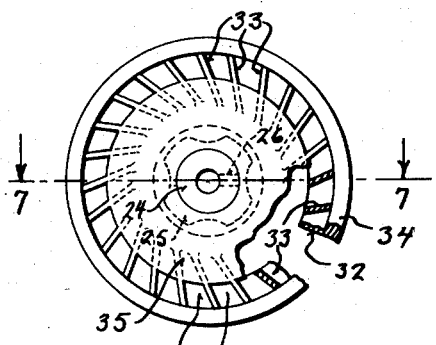
Figure 6 is an elevational view looking toward the hub plate side of the wheel, parts of the view being shown broken away and in section, the wheel being of a slightly modified type.
Figure 7:
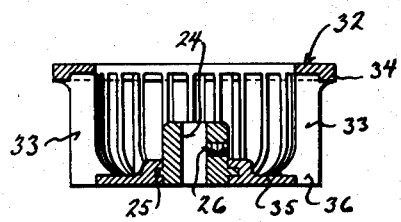
Figure 7 is a diametric sectional view through the modified form of the impeller wheel taken on the line 7—7 of Figure 6, looking in the direction of the arrows.

In Figures 6 and 7, we have shown a rim or ring 32, which is formed integral with the outer ends of the blades 33 and the ring projects beyond the outer edges of the blades as at 34. In order to permit the pulling of this type of wheel from the mold, the hub plate 35 is left open between the blades 33, as at 36. This forms an exceptionally strong wheel, with only a slight increase of weight at the reinforcing ring 32.

In the form of the invention shown in Figure 8, we provide a construction exactly similar to that form shown in Figure 7, with the exception that a reinforcing ring 37 is employed which extends only to the outer edges of the blades. This also forms a strong method of connecting the outer ends of the blades and it is to be noted that in this form the hub plate is open between the blades to permit the withdrawal of a completed wheel from the two-part mold.

In that form of our invention shown in Figure 9, we provide a reinforcing ring 38, which is of the same type and character as the ring shown in Figures 7 and 8, with the exception that the ring 38 projects inwardly toward the axial center of the wheel slightly beyond the inner edges of the blades. In this form the hub plate is left open between the blades and to a distance which corresponds with the inner edge of the ring 38, as at 39. This facilitates the withdrawal of the wheel from a two-part mold.

In Figure 10, we have shown a wheel similar to that form of our wheel shown in Figures 1 to 5, inclusive, and in this form, we provide a reinforcing ring 40, which is connected to the inner edges of the blades in lieu of the outer edges of the blades. In this form the spaces between the blades is also left open and the spaces extend to the extreme inner edge of the ring 40, as at 41.

In those forms of our invention (Figures 7 to 10) where spaces are left in the hub plates between the blades, fillets 41' can be utilized on the blades to reinforce the connection thereof with the hub plates and as illustrated these fillets extend over the inner face of the hub plates.

In Figures 11, 12 and 13, we have illustrated a slightly different type of impeller wheel than shown in Figures 1 to 10, inclusive, in that in this form we do not utilize a complete continuous reinforcing ring. Referring specifically to Figures 11, 12 and 13, we provide a wheel embodying a hub plate or disc 42. In this form the hub 43 can be cast in the plate at the time of the molding of the wheel. The periphery of the plate 42, in effect, is provided with outwardly extending arms 44 and the edges of the arms carry the laterally extending blades 45. The outer ends of adjacent blades are connected by an integral piece 46. These connecting pieces 46 are alternately arranged relative to the arms 44. Thus, we have provided a continuous rim arranged in a sinuous fashion with the blades 45 still arranged in their spaced, parallel position relative to one another. By providing the spaces 47 at the outer ends of the blades and the spaces 48 at the inner ends of the blades between the arms 44, this impeller wheel can be molded in one operation and readily removed from a two-section mold.

While it is preferred to form the impeller wheel from a single casting, we do not wish to so limit ourselves, and as shown in Figures 14 to 16, the blades 49 can be cast on a hub plate 50, after which a reinforcing ring 51 can be secured to the outer ends of the blades by a suitable adhesive or chemical compound causing integral flow of the material forming the blades and the ring. In Figures 14 to 16, we have shown that type of our impeller wheel in which the ring is connected to the outer edges of the blades (see Figure 14) and if desired the inner periphery of the ring can be slotted as at 52 (see Figures 15 and 16) so that the edges of the blades can be received within the ring.

While in all instances, it is preferred to connect the hub with the hub plate during the time of the molding of the wheel, obviously, the hub can be connected to the plate in other ways. For instance, in Figure 17, we have shown a hub 53 having an annular flange 54 adjacent to, but spaced from one end thereof. In this form, the hub can be inserted through an opening 55 in a hub plate 56, after which the outer end of the hub can be flanged over the hub plate 56, as at 57. If desired, reinforcing washer 58 can be interposed between the hub plate 56 and the flanged over end 57 of the hub 53.

Obviously, the reinforcing ring does not have to be located at the extreme outer ends of the impeller blades and in Figure 18, we have shown a reinforcing ring 59, carried by impeller blades 60 intermediate the opposite ends of the blades. This ring 59 can be either molded on the blades or can be cemented to the blades in the same manner as described for that form of our invention shown in Figures 15 and 16.

In the drawings, we have shown flat blades, but it is to be understood that the blades can be curved transversely without departing from the spirit or the scope of this invention.

From the foregoing description, it can be seen that we have provided an exceptionally simple and light form of air impeller wheel, which is of a strong and durable character.

Other changes in details may be made without departing from the spirit or the scope of this invention, but what we claim as new is:

As a new article of manufacture a one-piece integrally cast plastic impeller wheel of the cup type constructed to be cast in a two-part permanent mold, said wheel comprising a hub plate, blades projecting laterally from the inner face of the plate having their inner ends formed integral with the plate on its inner face, the outer edge of each blade being perpendicular to the plane of said plate, and an integral reinforcing ring connecting the blades at a point remote from the plate, said reinforcing ring being integral with the outer edges only of said blades and lying entirely beyond the outer periphery of the plate, said blades being substantially equidistantly spaced both at their inner and outer ends and having their inner edges terminating decidedly short of the axial center of the hub plate.

RUDOLPH L. MELTZER.
HENRY E. MELTZER.

References Cited in the file of this patent

UNITED STATES PATENTS

| Number | Name | Date |
|---|---|---|
| 662,525 | Davidson | Nov. 27, 1900 |
| 1,513,763 | Rowe | Nov. 4, 1924 |
| 1,941,527 | Aske | Jan. 2, 1934 |
| 2,138,814 | Bressler | Dec. 6, 1938 |
| 2,160,667 | McMahan | May 30, 1939 |
| 2,216,747 | Klimek | Oct. 8, 1940 |
| 2,231,062 | Evans | Feb. 11, 1941 |
| 2,272,695 | Evans | Feb. 10, 1942 |
| 2,424,501 | Place | July 22, 1947 |
| 2,486,619 | Troxler | Nov. 1, 1949 |

FOREIGN PATENTS

| Number | Country | Date |
|---|---|---|
| 14,103 | Great Britain | 1913 |
| 225,640 | Great Britain | Dec. 11, 1924 |
| 250,542 | Great Britain | Feb. 19, 1926 |
| 534,486 | Great Britain | Mar. 7, 1941 |